(12) United States Patent
Seidl et al.

(10) Patent No.: US 8,103,690 B2
(45) Date of Patent: Jan. 24, 2012

(54) REALTIME DATABASE ARCHITECTURE

(75) Inventors: Robert Seidl, Portola Valley, CA (US); Frank Flynn, Palo Alto, CA (US); David R. Thompson, San Francisco, CA (US); Michael DeLorenzo, San Francisco, CA (US)

(73) Assignee: Genius.Com, San Mateo, CA (US)

( * ) Notice: Subject to any disclaimer, the term of this patent is extended or adjusted under 35 U.S.C. 154(b) by 956 days.

(21) Appl. No.: 11/418,416

(22) Filed: May 3, 2006

(65) Prior Publication Data

US 2007/0112800 A1    May 17, 2007

Related U.S. Application Data

(60) Provisional application No. 60/687,094, filed on Jun. 3, 2005.

(51) Int. Cl.
 *G06F 17/30* (2006.01)
(52) U.S. Cl. ........................................ 707/769; 707/736
(58) Field of Classification Search .................. None
See application file for complete search history.

(56) References Cited

U.S. PATENT DOCUMENTS

| | | | |
|---|---|---|---|
| 5,550,971 A | 8/1996 | Brunner et al. | |
| 5,708,780 A | 1/1998 | Levergood et al. | |
| 5,721,901 A | 2/1998 | Banning et al. | |
| 5,920,856 A | 7/1999 | Syeda-Mahmood | |
| 5,935,207 A | 8/1999 | Logue et al. | |
| 6,029,141 A | 2/2000 | Bezos et al. | |
| 6,052,730 A | 4/2000 | Felciano et al. | |
| 6,345,292 B1 | 2/2002 | Daugherty et al. | |
| 6,598,051 B1 | 7/2003 | Wiener et al. | |
| 7,043,555 B1 | 5/2006 | McClain et al. | |
| 7,054,858 B2 | 5/2006 | Sutherland | |
| 7,072,947 B1 | 7/2006 | Knox et al. | |
| 7,076,533 B1 | 7/2006 | Knox et al. | |
| 7,120,590 B1 | 10/2006 | Eisen et al. | |
| 7,127,608 B2 | 10/2006 | Royer et al. | |
| 7,236,972 B2 | 6/2007 | Lewak et al. | |
| 2002/0010757 A1 | 1/2002 | Grank et al. | |

(Continued)

FOREIGN PATENT DOCUMENTS

EP    0 926 614 A2    6/1999

(Continued)

OTHER PUBLICATIONS

PCT Preliminary Report on Patentability, PCT/US2006/020603 issued Dec. 6, 2007 (1 page).

(Continued)

*Primary Examiner* — Charles Rones
*Assistant Examiner* — Yuk Ting Choi
(74) *Attorney, Agent, or Firm* — Blakely, Sokoloff, Taylor & Zafman LLP

(57) ABSTRACT

A method and apparatus is disclosed herein for automatically supplying data items to a client. In one embodiment, the method comprises determining, from among a plurality of data items displayable by a client, one or more relevant data items to be supplied to the client, the plurality of data items displayable by a client located in a first database corresponding to a tracked user's interactions with a website. The one or more relevant data items are then automatically supplied to the client. The method also includes storing a copy of the supplied one or more relevant data items in a second database.

27 Claims, 15 Drawing Sheets

U.S. PATENT DOCUMENTS

| | | | |
|---|---|---|---|
| 2002/0128908 A1* | 9/2002 | Levin et al. | 705/14 |
| 2003/0014403 A1 | 1/2003 | Chandrasekar et al. | |
| 2003/0225834 A1* | 12/2003 | Lee et al. | 709/204 |
| 2004/0117486 A1 | 6/2004 | Bourne et al. | |
| 2005/0010557 A1 | 1/2005 | Dettinger et al. | |
| 2005/0038900 A1 | 2/2005 | Krassner et al. | |
| 2005/0044101 A1* | 2/2005 | Prasad et al. | 707/102 |
| 2005/0102271 A1 | 5/2005 | Robertson | |
| 2005/0119913 A1* | 6/2005 | Hornreich et al. | 705/2 |
| 2005/0222981 A1 | 10/2005 | Lawrence et al. | |
| 2005/0256908 A1 | 11/2005 | Yang et al. | |
| 2006/0020580 A1 | 1/2006 | Dettinger et al. | |
| 2006/0041550 A1* | 2/2006 | Bennett et al. | 707/5 |
| 2006/0059238 A1* | 3/2006 | Slater et al. | 709/206 |
| 2006/0212362 A1* | 9/2006 | Donsbach et al. | 705/26 |

FOREIGN PATENT DOCUMENTS

| | | |
|---|---|---|
| WO | WO 00/41118 A2 | 7/2000 |
| WO | WO 01/41002 | 6/2001 |
| WO | WO 2005/006216 | 1/2005 |

OTHER PUBLICATIONS

PCT Written Opinion of the International Searching Authority, PCT/US2006/020603 issued Dec. 6, 2007 (6 pages).

Baeza-Yates, R, et al, "Relating web characteristics with link based web page ranking," String Processing and Information Retrieval, 2001. SPIRE 2001. Proceedings Eighth International Symposium, Nov. 13-15, 2001, pp. 21-32.

International Search Report and Written Opinion of the International Searching Authority, European Patent Office, Application No. PCT/US2006/020604 mailed Oct. 25, 2006.

Office Action dated Sep. 10, 2008, U.S. Appl. No. 11/417,949, filed May 3, 2006.

Final Office Action dated Feb. 3, 2009, U.S. Appl. No. 11/417,949, filed May 3, 2006.

Office Action dated Apr. 25, 2008, U.S. Appl. No. 11/417,948, filed May 3, 2006.

Final Office Action dated Oct. 28, 2008, U.S. Appl. No. 11/417,948, filed May 3, 2006.

Office Action dated Mar. 25, 2009, U.S. Appl. No. 11/417,948, filed May 3, 2006.

Office Action dated Jun. 8, 2009, U.S. Appl. No. 11/417,949, filed May 3, 2006.

Final Office Action dated Oct. 27, 2009, U.S. Appl. No. 11/417,948, filed May 3, 2006.

International Search Report and Written Opinion of the International Searching Authority, European Patent Office, Application No. PCT/US2006/020603 mailed Nov. 20, 2006. 11 pages.

Office Action dated Feb. 16, 2010, U.S. Appl. No. 11/417,948, filed Jul. 21, 2010.

Office Action dated Jun. 8, 2009, U.S. Appl. No. 11/417,949, filed May 3, 2006.

* cited by examiner

REALTIME DATABASE ARCHITECTURE

PRIORITY

The present patent application claims the benefit of U.S. provisional patent application No. 60/687,094 filed on Jun. 3, 2005 titled "Adaptive Dataflow Acceleration For Realtime Client Updating" and hereby incorporates it by reference.

RELATED APPLICATIONS

This application is related to the co-pending application entitled Deep Clickflow Tracking, concurrently filed on May 3, 2006, U.S. patent application Ser. No. 11/417,949, and Database Query Construction and Handling, concurrently filed on May 3, 2006, U.S. patent application Ser. No. 11/417,948.

FIELD OF THE INVENTION

The present invention relates to the field of marketing information support systems; more particularly, the present invention relates to automatically supplying realtime data updates to a client.

BACKGROUND OF THE INVENTION

The internet continues to expand as a source of information gathering and information distribution. Businesses increasingly market, sell, support, and offer information about products to potential customers via the internet. To provide marketing support to businesses, approaches have been developed which provide information about how business' web sites are used. Data corresponding to web site use is then stored in a database, so that the data can later be analyzed. Given the size and frequency with which data updates may be received, the prior approaches for supplying relevant and up-to-date data regarding web site use suffers from serious shortcomings.

One prior approach required customer initiated interactions with a database, or a program user interface providing access to the data within a database, to determine if an updated data was available or needed. That is, a customer would be required to request an update which would in turn initiate a data inspection. From the customer initiated data inspection, if there was an update to data stored in a database, the new data could be supplied. However, such an "on demand" service may not provide relevant and/or timely updates to business and marketing professionals. For example, a website may receive thousands of hits a day on a specific web page devoted to a product. Such activity might imply that there is a rising interest in the product among potential consumers. However, the data corresponding to the potential interest in the product will not be communicated to the marketing professional until the marketing professional initiates a database query. Further, such information may necessitate quick decisions relating to advertising and/or marketing campaigns in order to capitalize on the rising potential interest in the product. If such opportunities are not seized quickly, the opportunities are diminished, or may disappear entirely.

When a website receives hundreds or thousands of hits each day, the data generated and stored in the database can be enormous, amounting to millions of database records. Thus, when a customer initiates a data inspection to determine whether new data is available, queries on the database storing the data are triggered. However, periodically running database queries against millions of records is inefficient and consumes valuable system resources. Furthermore, the queries may operate on data which has not changed in some time, thus wasting processing time of a system by executing unnecessary queries.

Therefore, using the approaches described above, marketing professionals are not afforded a full picture of how their web site are being used.

SUMMARY OF THE INVENTION

A method and apparatus is disclosed herein for automatically supplying data items to a client. In one embodiment, the method comprises determining, from among a plurality of data items displayable by a client, one or more relevant data items to be supplied to the client, the plurality of data items displayable by a client located in a first database corresponding to a tracked user's interactions with a website. The method also includes automatically supplying the one or more relevant data items to the client and storing a copy of the supplied one or more relevant data items in a second database.

Other features and advantages of the present invention will be apparent from the accompanying drawings and from the detailed description that follows below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 8A-8C illustrate embodiments of a client graphical user interface.

DETAILED DESCRIPTION

Figure 1A:
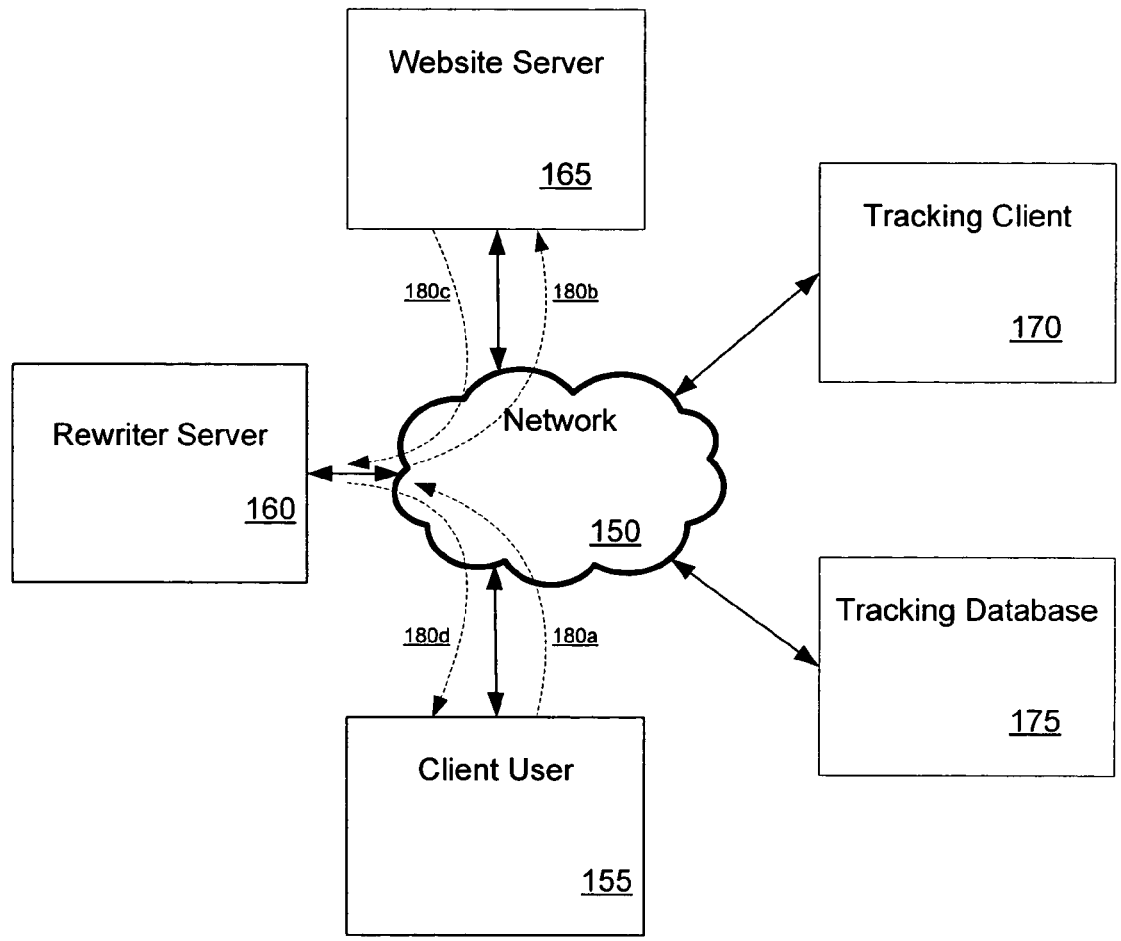
FIG. 1A illustrates one embodiment of a network for implementing a realtime database architecture.

An apparatus for a real time data base architecture and method for using the same are described. In one embodiment, the method includes determining relevant data items to be supplied to a client from a first database, from among multiple data items that may be displayed by the client. In one embodiment, the one or more relevant data items are automatically supplied to the client, so that the client need not request an update. A copy of the one or more relevant data items supplied to the client are then stored in a second database.

In one embodiment, the first time a client is opened, all data items displayable by the client are supplied from the first database to the client by a server. A copy of each item is stored in a second database so that the second database reflects the status of what is being displayed by the client. When an update of the data items displayable by the client is to occur, the data items which are currently being displayed by the client is determined and compared with corresponding data items in the second database that contains a current version of the data objects that are available for display. Based on the comparison, one or more current data items, corresponding to the one or more items currently being displayed, but which are not current, are automatically supplied to the client. A copy of the current data supplied to the client is then stored in the second database.

Beneficially, the client need not request the update, because the updates are automatically supplied to the client while the client is online. Because the data currently being displayed, and not the multiple items that may be displayed, is utilized for comparison, the amount of data needed for inspection is reduced. As a result, processing resources are used more efficiently by seeking updates to data items currently being displayed by the client, and which have changed since the last update.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1A is a network diagram of one embodiment of a network that may be used to implement the realtime database architecture, as discussed below. The realtime database architecture supplies tracking client 170 with clickflow data in pseudo realtime, as well as updates to the data. Clickflow tracking data is data indicative of client user's 155 interactions with a web page, which includes link selection, sequence of web pages visited on a web site, time on a web page, etc.

For one embodiment, network 150 is the internet. In another embodiment, network 150 is a wireless application protocol (WAP) network. Other networks, such as local area network (LANs), wide area networks (WANs), digital subscriber lines (DSL), etc. may be utilized as networks for the realtime database architecture.

Client user 155 may be used to run a web browser program to interact with a web page served by website server 165. Clickflow tracking data is generated when rewriter server 160 receives a request 180a for web content, such as a web page, served by website server 165. In one embodiment, request 180a is received by rewriter server 160 when client user 155 selects a modified link which is modified to resemble a link to website server 165, but which resolves at rewriter server 160.

In one embodiment, upon receiving the request for web content, corresponding to the link selection, rewriter server 160 stores data indicative of the link selection in tracking database 175. In addition to link selection, rewriter server may store additional items of clickflow data such as time on page, timestamps, identity of the requester, time on site etc. In one embodiment, rewriter server 160 stores the data in tracking database 175 through network 150. In another embodiment, tracking database 175 may be coupled to rewriter server 160.

Rewriter server 160 then requests a website 180b, corresponding to link selection 180a, from website server 165. Rewriter server then receives the requested web site 180c from website server 165. In one embodiment, rewriter server 160 rewrites uniform resource locator (URL) links, as well as other links, within the received web page to resemble links to website server 165, but to again resolve at rewriter server 160. Rewriter server 160 then supplies 180d the web site with the modified links to client user 155. Therefore, for subsequent requests for web content received from client user 155, control again returns to rewriter server 160 in order to store clickflow data in tracking database 175 and supply modified web pages to client user 155. As such, a detailed record of client user's 155 interactions with web content served from website server 165 is recorded.

In one embodiment, tracking client 170 is an application run on a computing system utilized to monitor and receive updates to tracking database 175. In one embodiment, tracking client 170 displays updated information received from a tracking server (not shown) on a graphical user interface as client user 155 is being tracked. Furthermore, because comprehensive clickflow tracking data is stored in tracking database 175, tracking client 170 has access to the most current clickflow tracking data, as well as past clickflow tracking data.

Figure 1B:
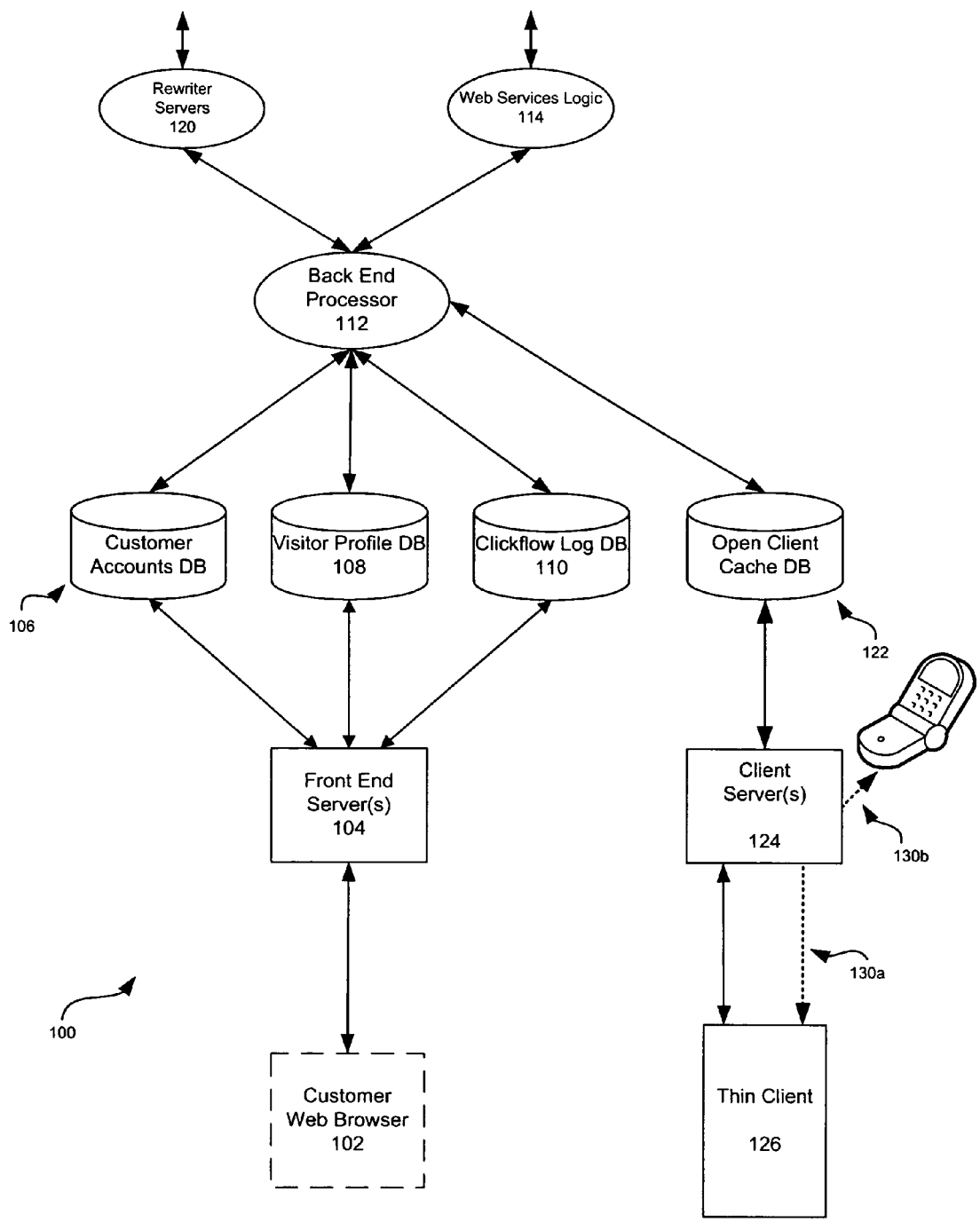
FIG. 1B illustrates one embodiment of a system for implementing a realtime database architecture.

FIG. 1B is a block diagram providing an overview of a system for implementing a realtime database architecture. In one embodiment, front end server(s) 104 receive URLs from customer web browser 102, though other resource identifiers and locators may be used. The URLs provide addresses for web content, where user interactions with the web content can be tracked. Front end server(s) 104 may be a single server or multiple servers. Further, front end server(s) 104 may be located directly in proximity to or remote from databases 106-108.

Customer web browser 102 is displayed in dashed lines to indicate that it is not part of the realtime database architecture, but communicates with the architecture. In one embodiment, front end server(s) 104 communicate with customer web browser 102 using standard Hyper Text Transfer Protocol (HTTP) protocols. However, any form of communication could be utilized to receive a URL, or an indication of the URL, to be tracked.

Upon receiving a request from customer web browser 102, front end server(s) 104 obtain customer account information which is stored in customer account database 106. In one embodiment, customer account database 106 stores, among other items, customer URLs, customer contact information, customer names, customer addresses, modified URLs, etc. Customer accounts database 106 can be configured to store any information relevant to the customer and/or useful to administering a thin client 126 of the realtime database architecture.

Back end processor 112 modifies URLs and stores the modified URLs in one or more of databases 106-110. The modified URLs are later utilized to facilitate recording clickflow data associated with user within the relevant sections of the clickflow log database 110, visitor profile database 108, and/or customer accounts database 106, and which is discussed in greater detail in [copending application]. In one embodiment, the modified URL is referred to as a GURLs, and it is addressed to a server that is able to provide deep clickflow tracking services of customers interactions with a website. The modified URL, or GURL, is modified to resemble a URL for a web page in this web site, but to resolve at a location (e.g., another server) through which the interactions of a user can be tracked. The web page includes links that are modified as well. In one embodiment, these modified links resolve at an address of rewriter servers 120. When a link is selected, the modified link the customer selected is stored, as well as other data, so that tracking information can be stored in one or all of databases 106-108.

In one embodiment, a web page with modified links is transmitted by front end server(s) 104 to customer web browser 102. In one embodiment, the web page is transmitted using standard HTTP protocols so that it can be received in any HTTP compliant web browser.

Rewriter servers 120 receive data indicative of a user's selection of a modified link. In one embodiment, the link may include a key into the relevant portions of databases 106-110 used by the back end processor 112 to store link selection. In another embodiment, back end processor 112 performs a look-up to correlate a link with a person being tracked before link selection is stored in one or more of databases 106-110. The clickflow relevant data may include, for example, presence on a website, duration of a user on a website, sequence of pages visited within a website, time on page, referred, etc. Rewriter servers 120 then request the web page associated with the selected modified link and subsequently modifies links within the web page before supplying the user with the web page. As such, rewriter servers 120 supply the user with the requested web page, including modified links, so that rewriter server 120 can continue to track the user's interactions with the web site.

Web services may also be supplied by web services logic 114 in connection with deep clickflow tracking information gathered by rewriting servers 120. In one embodiment, web services logic 114 supports customer advertising web services or to provide a customer with new or additional advertising web services. In one embodiment, the advertising web services supplied by web services logic 114 include, for example, cost-per-click (CPC) processing associated with advertisements, monitoring keywords associated with an advertisement, impression recordation, etc.

In one embodiment, web services logic 114 supplies customer/tracked individual interaction tools. The tools include, for example, "personal notes" left on a web page by a customer and/or tracked individual for the customer and/or tracked individual, text invitations, audio invitations, video invitations, chat invitations, personalized content based on the source of a tracked individual (e.g., customized to tracked individuals who are tracked after selecting a Google advertisements verses Yahoo advertisements), keyword matching, search term matching, etc. In one embodiment, web services logic 114 further supplies programmatically triggered interaction tools based on clickflow data. For example, web services logic 114 can send tracked individuals a "10% discount coupon" to specific tracked individuals tracked from Google searches, tracked individuals that have been to the customer website more than 3 times, other conditions indicating high interest, etc.

In one embodiment, web services logic 114 provides customer resource management (CRM) web services. The CRM web services would users and customers. The CRM web services could monitor and/or provide customers with contact information for users, sales information, monetary amounts, etc. Further, in one embodiment, the CRM services provided by web services logic 114 support ongoing business activities.

In one embodiment, web services logic 114 provides e-mail support services. Such e-mail support services include one or more of sending notifications whenever a modified link has been selected, user presence on a website is detected, a database has been update, etc. Furthermore, the notifications may include audio or visual indications of the notification. In one embodiment, web services logic 114 sends out notifications when a programmed condition has been met. For example, web services 114 logic may be configured to send notifications to a client whenever a user selects a specific link, traverses a sequence of pages, etc.

In one embodiment, the e-mail support services supports update notifications in Short Message Service (SMS) form so that update notifications may be distributed over wireless networks. One skilled in the art will recognize the various channels of distributing update notifications.

Although specific examples have been discussed above with respect to web services logic, any number of services, notifications and associated conditions relevant to advertising, marketing, CRM services, email services, etc., can be provided by the web services logic 114 as will be apparent to those skilled in the art.

Thin client 126 operates on a computing system (not shown), for displaying data information such as updated content. In one embodiment, thin client 126 is a user interface implemented in standard Hyper Text Markup Language (HTML) to resemble an instant messenger client.

As such, thin client 126 may be utilized on any computing device capable of displaying documents (e.g., HTML documents), such as personal computers, Professional Digital Assistants (PDAs), cellular telephones, etc. Thin client 126 may further be implemented in, Dynamic HTML (DHTML), JavaScript, Extensible Markup Language (XML), Asynchronous JavaScript and XML (AJAX), or any other language for creating documents capable of being displayed on a computing device. Furthermore, in one embodiment, because the thin client 126 resembles an instant messenger client, the display of thin client can be resized or made display size sensitive so that user interface implemented by thin client 126 can be adapted to the thin client's 126 display. Thin client 126 receives updates to clickflow data automatically supplied by client server(s) 124. The updates might be one or more of an email being opened, a web site being requested, a chat session taking place, etc. The updates are received by the thin client 126 in pseudo real time while thin client 126 is open. In one embodiment, thin client 126 receives the updates in repeating increments of time, such as every 10 second, every 15 second, every 25 seconds, etc. In another embodiment, thin client 126 receives updates when a processing cycle of client server 126 for processing updates is completed, or the updates are supplied at intervals which are influenced by a current processing load of client server 126. Thus, a user using thing client 126 perceives receiving updated clickflow data in real time, when in fact the data is received discrete increments of time. In one embodiment, data is communicated between client server(s) 124 and thin client 126 using standard HTTP communication protocols. In another embodiment, data is communicated between server(s) 124 and thin client 126 using proprietary communication protocols.

Client server(s) 124 may include or be integrated into servers 120, web services logic 114, or front end server(s) 104. Furthermore, in one embodiment, client server(s) 124 are distributed geographically to distribute processing loads handled by client server(s) 124 across a geographic area. Client server(s) 124 may further include identical and/or back up servers to supply updated data to thin clients 126 in case a client server either fails, or taken off-line for maintenance.

In one embodiment, client server(s) 124 determine when and what data is automatically supplied to thin client 126. Client server(s) 126, at some predetermined interval (e.g., every 10 seconds, every 15 seconds, every 25 seconds, etc.), check for updates to data items which are displayable by thin client 126. Based on the size of the databases 106-110 and the numerous data items displayable by thin client 126, client server(s) 124 determine one or more relevant data items to supply to thin client 126 from databases 106-110. In an embodiment, relevant data items are data items that will be provided to a thin client that is currently being used online (e.g., thin client 126 is receiving updates from client server(s) 124), items which are currently being displayed by thin client 126, and data items which have changed since the last time data was updated on a thin client.

When one or more relevant data items are automatically supplied to thin client 126, client server(s) 124 further store a copy of the supplied data in a database, such as open client cache DB 122. Open client cache DB 122 further maintains an indication of whether a particular thin client 126 is online. When a thin client, such as thin client 126, is on-line, client server(s) 124 determine what data items are currently being displayed and what data items have previously been supplied to the thin client 126. This information is stored in open client cache DB 122. The resulting subset of data items is much smaller than all possible data items displayable by thin client 126, so less resources are needed to determine if any data items from the subset need to be updated on thin client 126.

In one embodiment, client server(s) 124 compare the copy of the data items, stored in open client cache DB 122, which are currently being displayed by an on-line thin client 126 with the corresponding current data items located in databases 106-110. Based on the comparison, client server(s) 124 automatically supply updated data corresponding to changed data that is currently being displayed by the thin client 126. As a result, the data updates are supplied more efficiently with less computing overhead. Furthermore, by supplying relevant data, instead of constantly refreshing all the data, flicker of the client user interface is avoided.

Furthermore, in order to prevent and avoid a backlog of processing updates when clients come on-line, client server (s) 124 periodically update open client cache DB 122 for off-line clients and for data which is not currently being viewed by an on-line client. Thus, periodically, client server (s) 124 compare the current data located on servers 106-110 with the data located on open client cache DB 122, and update open client cache DB 122 accordingly.

In one embodiment, as a result of the periodic open client cache DB updates, client server(s) 124 may further send out notifications 130a to thin client 126 and/or 130b to other locations, such as a cell phone, voice mail, text message, SMS message, etc. regarding the changed status of information available to a thin client, a programmatic condition set on a thin client being satisfied, an indication of presence of a web site visitor, etc. Any number of conditions could trigger a notification regarding the information available to a thin client. If thin client 126 is online, the notification 130a can be transmitted directly to the thin client and displayed on its user interface. If the thin client 126 is off-line, client server(s) 124 may send thin client 126 a notifications 130b using any alternative form of communication (e.g., an email, a page, a text message, a Short Message Service (SMS) message, etc.). Therefore, even when a user of thin client 126 is off-line, client server(s) 124 automatically provide updates as to relevant information and updates thereto.

For example, the user of a thin client may want to be informed whenever a specific sequence of pages of the user's web site is traversed, as indicated by clickflow data stored in databases 106-110. Thus, a notification attached to this programmatic condition would be triggered during a periodic update of open client cache DB 122 by client server 124, when a visitor traverses the specified pages. When thin client 126 is online, the user interface could be provided with a notification 130a through text, audio, and/or visual indicators. When the thin client 126 is off-line, as indicated in open client cache DB 122, client server(s) 124 one or more other form of communication (e.g., a paging service, SMS messages, text messages to a cellular telephone, etc.) to provide notifications 130b. Furthermore, the messaging approaches need not be restricted to an on-line/off-line dichotomy as any combination of notification techniques could be utilized by client server(s) 124.

Figure 2:
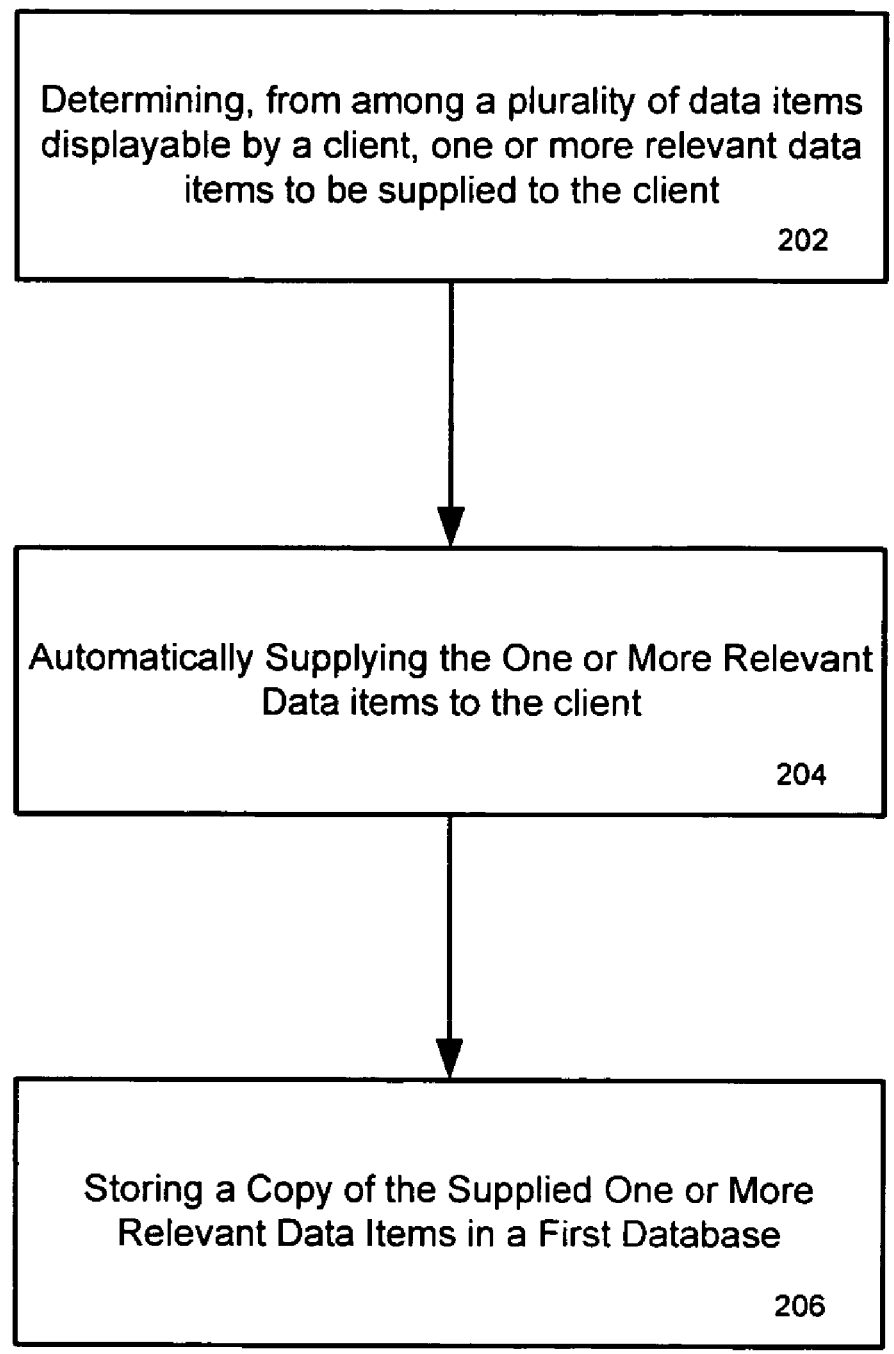
FIG. 2 illustrates a flow diagram of an overview for one embodiment of a process for automatically supplying data items to a client of the realtime database architecture.

FIGS. 2 illustrate a flow diagram of an overview of one embodiment of a process for automatically supplying data items to a client of the realtime database architecture. The process is performed by processing logic that may comprise hardware (circuitry, dedicated logic, etc.), software (such as is run on a general purpose computer system or a dedicated machine), or a combination of both. In one embodiment, the processing logic is part of a client server(s).

The process begins, in FIG. 2, with processing logic determining, from among the multiple data items displayable by a client, one or more relevant data items to be supplied to the client (processing block 202). The data items displayable by a client are located on a database, as discussed above, in one embodiment, any number of data clickflow tracking data items which may be utilized by marketing professionals may be stored in the first database. In one embodiment, the data items include one or more of clickflow data, presence on a web page, presence on a web site, sequence of pages traversed, time on page, time on site, referrer, host internet protocol address, etc.

Next, processing logic automatically supplies the one or more relevant data items to the client (processing block 204). Because processing logic automatically supplies the relevant data, the shortcomings of an "on demand" system are avoided. Furthermore, the automatic supply of relevant data avoids a client failing to realize and utilize valuable current information.

Finally, in one embodiment, processing logic stores a copy of the supplied one or more relevant data items in a database (processing block 206). As will be discussed in greater detail below, the data stored in the database will be utilized by processing logic to reduce the amount of data necessary for when deciding what data is relevant and needs to be updated, as well as to preserve processing resources.

Figure 3:
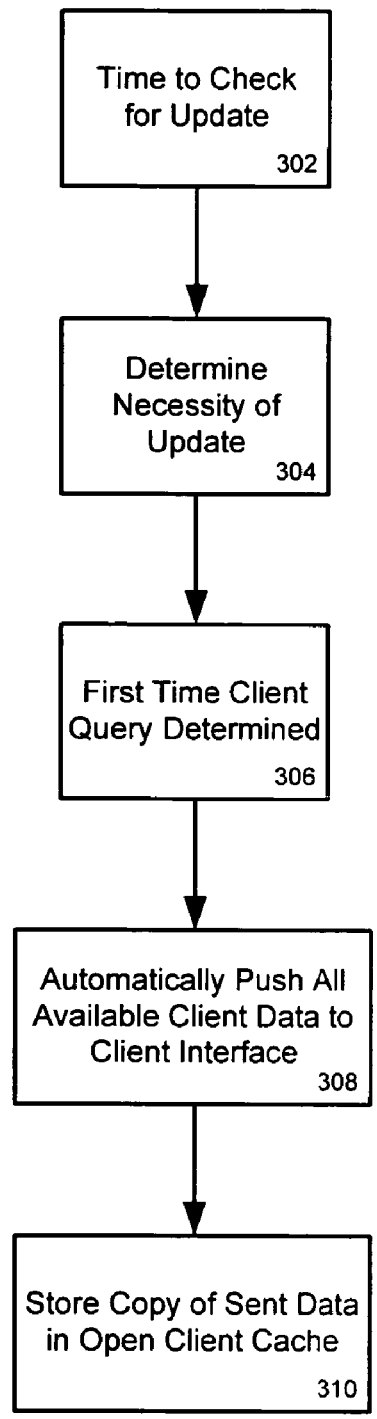
FIG. 3 illustrates a flow diagram of one embodiment of a process for automatically supplying data items to a client of the realtime database architecture.

FIG. 3 is a flow diagram of one embodiment of a process for automatically supplying data items to a client of the realtime database architecture for the first time. The process is performed by processing logic that may comprise hardware (circuitry, dedicated logic, etc.), software (such as is run on a general purpose computer system or a dedicated machine), or a combination of both. In one embodiment, the processing logic is part of a client server(s).

Refering to FIG. 3, the process begins with processing logic determining that it is time to check for an update to the data that is displayable by a client user interface (processing block 302). In one embodiment, processing logic determines it is time to check for updates at regular intervals (e.g., increments of time such as for example, every 10 seconds, every 15 seconds, every 25 second, every minute, etc.). In another embodiment, processing logic determines it is time to check for updates as soon as the previous update check has been finished. In yet another embodiment, the determination of update times is load and/or resource sensitive. As such, processing logic adapts to the current state of the realtime database architecture, so that data processing bottlenecks can be prevented and/or avoided.

Next processing logic determines the necessity of an update for a particular client (processing block 304). In one embodiment, the update is necessary when a client has any need for data. One indicator of a need for data is whether or not the client is currently online. Processing logic determines the online status of a client by either querying the client device or checking the on-line status of the client in the open client cache DB.

Procession logic then, in one embodiment, determines that the current data update operation is the first time the client has made such a query, (i.e., a first time client query) (processing block 306). A first time client query may occur in at least two situations. A first time client query may indicate that a client is on-line for the first time, and has never been on-line before. As such, all available client data is pushed to client for display on the user interface of the client (processing block 308). Because all the data is new for the first-time client, a copy of all the data is stored in the open client cache database (processing block 310). In one embodiment, the processing logic includes, in the copy of sent data, a timestamp accompanying the data and/or each piece of data. The timestamp may be utilized by processing logic to determine the relevancy of data and the last time the data was updated. Furthermore, processing logic may include an indication of the on-line status of the client.

When a first time client query indicates that a client has been on-line before, but has been off-line for some time, as determined from timestamps in previously copied data and/or on-line status of the client, all available client data is again pushed to the client interface (processing block 308). Furthermore, data is pushed to the client so that servers automatically provide updates to the client, without awaiting for a client initiated request.

In one embodiment, data is pushed to a client using HTTP protocol over port 80. Data is pushed by processing logic over port 80 in order to avoid the installation, configuration, and/or alteration of security software on corporate networks, such as internet firewalls. Communication of data over port 80 further allows processing logic to keep the connection alive, for example between a client server and a thin client operating on a user's computer, after the connection has been opened. In one embodiment, processing logic uses a HTTP header parameter Keep Alive in order to maintain the connection. In another embodiment, processing logic also sends small packets of non-operation ("no op") data over port 80 to the computing device utilizing a thin client. The small packets could be anything which would keep the connection alive such as, JavaScript statements, "/* */" empty comments, etc. Both methods of keeping the connection open ensure that a client and/or an intermediate firewall do not abort or shut down the current connection.

In another embodiment, processing logic responds to a request of the client, where the client is configured to periodically send processing logic XMLHTTPRequest calls. In this embodiment, processing logic responds with a "no update necessary" response, or a response in conformity with processing block 308.

In one embodiment, processing logic then stores a copy of the sent data in open client cache database (processing block 310). As discussed above, the data may include a timestamp and/or a status as to whether a client is currently online.

Figure 4:
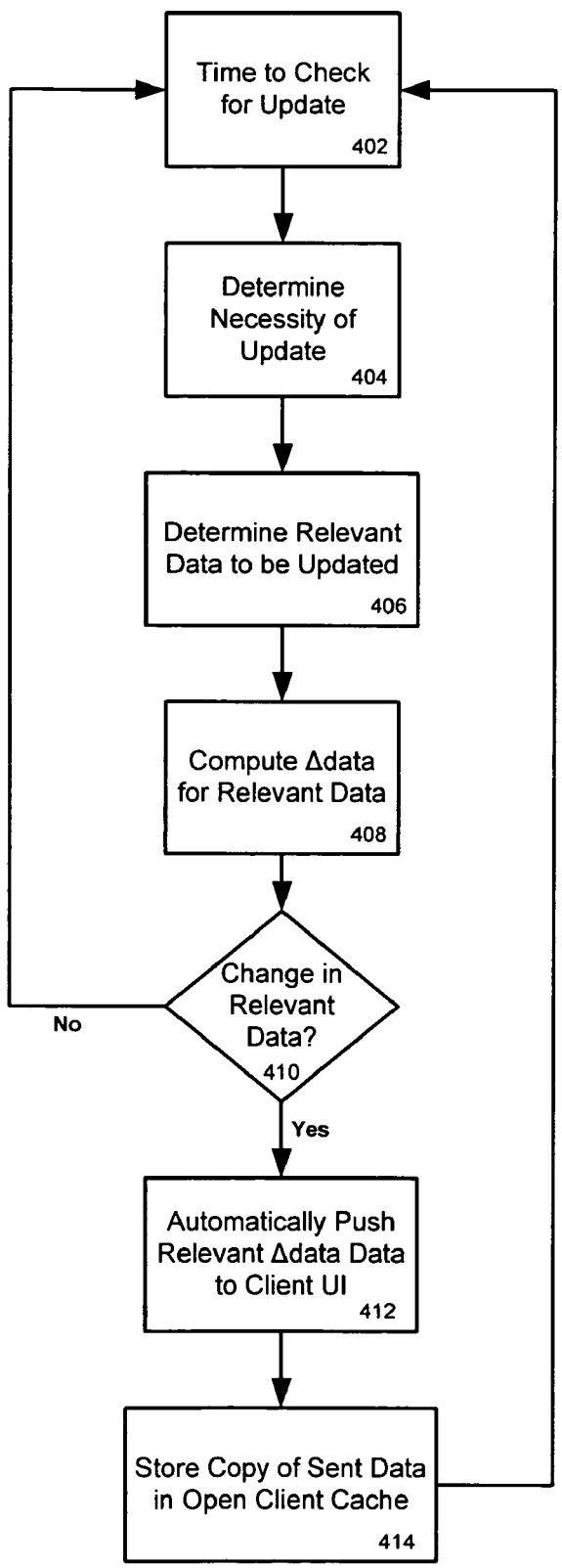
FIG. 4 illustrates a flow diagram of one embodiment of a process for automatically supplying data items to a client of the realtime database architecture subsequent to the first time.

FIG. 4 is a flow diagram of one embodiment of a process for automatically supplying data items to a client of the realtime database architecture after the client has previously received such data. The process is performed by processing logic that may comprise hardware (circuitry, dedicated logic, etc.), software (such as is run on a general purpose computer system or a dedicated machine), or a combination of both. In one embodiment, the processing logic is part of a client server (s).

In one embodiment, the process begins by processing logic determining it is time to check for an update to data items that are displayable by a client user interface (processing block 402). As discussed above, the time for an update may be one or more of the following: a regular repeating time interval, as soon as a processing finished a prior update cycle, in response to the current load of the realtime database, in response to available resources of the realtime database, etc.

Next, processing logic determines the necessity of an update to data items to be displayed by a client user interface (processing block 404). In one embodiment, this determination is based on whether a client is currently online, which indicates that the online client has some need, no matter how slight, for updated data.

After the necessity of an update is determined, processing logic determines the relevant data items to be updated (processing block 406). Data, as discussed above, is generally determined to be relevant when the data is currently being displayed by a client user interface. Processing logic determines what data is being displayed by a client user interface based on the client user interface requests for content.

For the relevant data, processing logic then computes what data currently being displayed on the user interface of a client is not current and needs to be updated, which will be referred to as Δdata (processing block 408). In order to compute Δdata, processing logic compares a stored copy of the relevant data items, i.e., the data currently being displayed by the client user interface, with the corresponding data items located in a database of current data items, such as databases 106-110. The comparison indicates whether the data currently being displayed by the client user interface is the most current data available in the realtime database architecture.

In one embodiment, processing logic determines whether or not a change in the relevant data has occurred (processing block 410). If a change has not occurred to the relevant data, processing logic returns to processing block 402 to await the next time to check for updates to data items. If a change has occurred, and one or more data items being displayed to the user interface do not reflect the current status of the data item, processing logic proceeds to processing block 412.

At processing block 412, processing logic then automatically pushes all relevant data which has changed, the Δdata, to the client user interface (processing block 412). As discussed above, in one embodiment, the updated/new data, or Δdata, is either pushed by processing logic to a client user interface over Port 80, or in response to a client user interface XMLHTTPRequest call.

Processing logic then stores a copy of the sent data in the open client cache database (processing block 414) before returning to processing block 402 where processing logic awaits the next time to check for an update (processing block 402).

Figure 5:
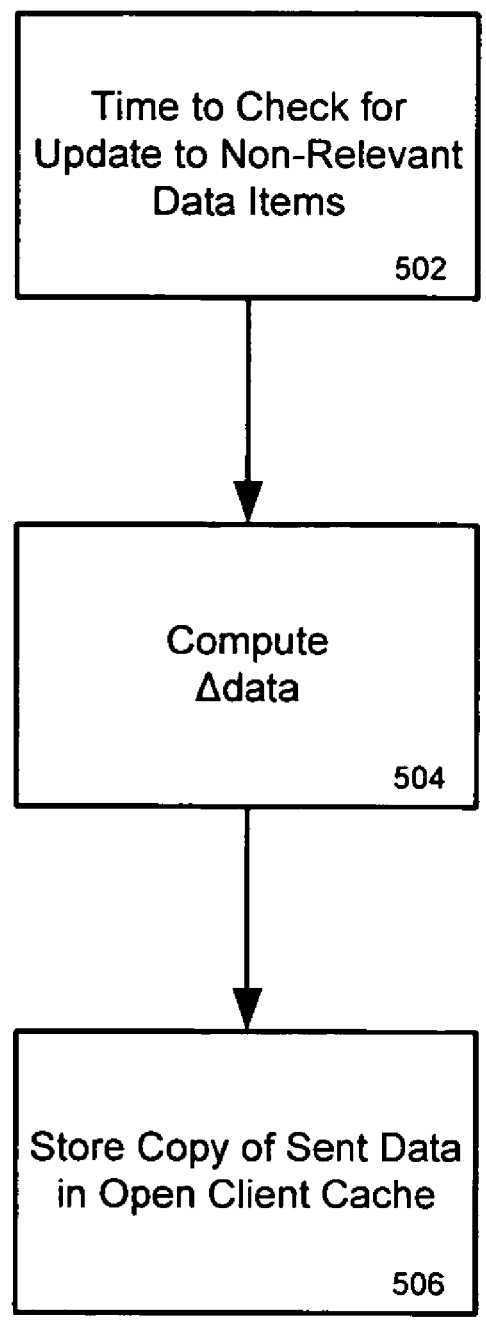
FIG. 5 illustrates a flow diagram of one embodiment of a process for periodically supplying data items to a client of the realtime database architecture.

FIG. 5 is a flow diagram of one embodiment of a process for periodically supplying data items to a client of the realtime database architecture. Processing logic performs the periodic updates, even when a client is off-line or when a client is not currently viewing certain data items, in order to avoid a backlog of processing when, for example, a large number of clients come on-line at the same time. Furthermore, periodic updates reduce the frequency and the extent of future updates to the open client cache database. The process is performed by processing logic that may comprise hardware (circuitry, dedicated logic, etc.), software (such as is run on a general purpose computer system or a dedicated machine), or a combination of both. In one embodiment, the processing logic is part of a client server(s).

Referring to FIG. 5, the process begins by processing logic determining that it is time to check for updates to non-relevant data items for a client (processing block 502). As discussed above, relevant data items are items currently being displayed in a client user interface being used by a client to display data items. Therefore, non-relevant data items are those data items which are displayable by a client user interface, but are not currently being displayed because the client is offline or the client user interface is not currently displaying the data item(s). In one embodiment, processing logic may determine the time to update non-relevant data items based on a predetermined period, which may be greater than the update period for relevant data items. In another embodiment, the time period is sensitive to system load and system resources of the realtime database, so that the time for updates further preserves system resources.

Processing logic then computes a Δdata for all the data of a client (processing block 504). In one embodiment, the Δdata computation includes computing a Δdata for all data of an offline client. In another embodiment, the Δdata computation includes computing a Δdata for the non-relevant data items of an online client. After the Δdata has been computed by processing logic, processing logic stores the data updates in an open client cache database (processing block 508).

Figure 6A:
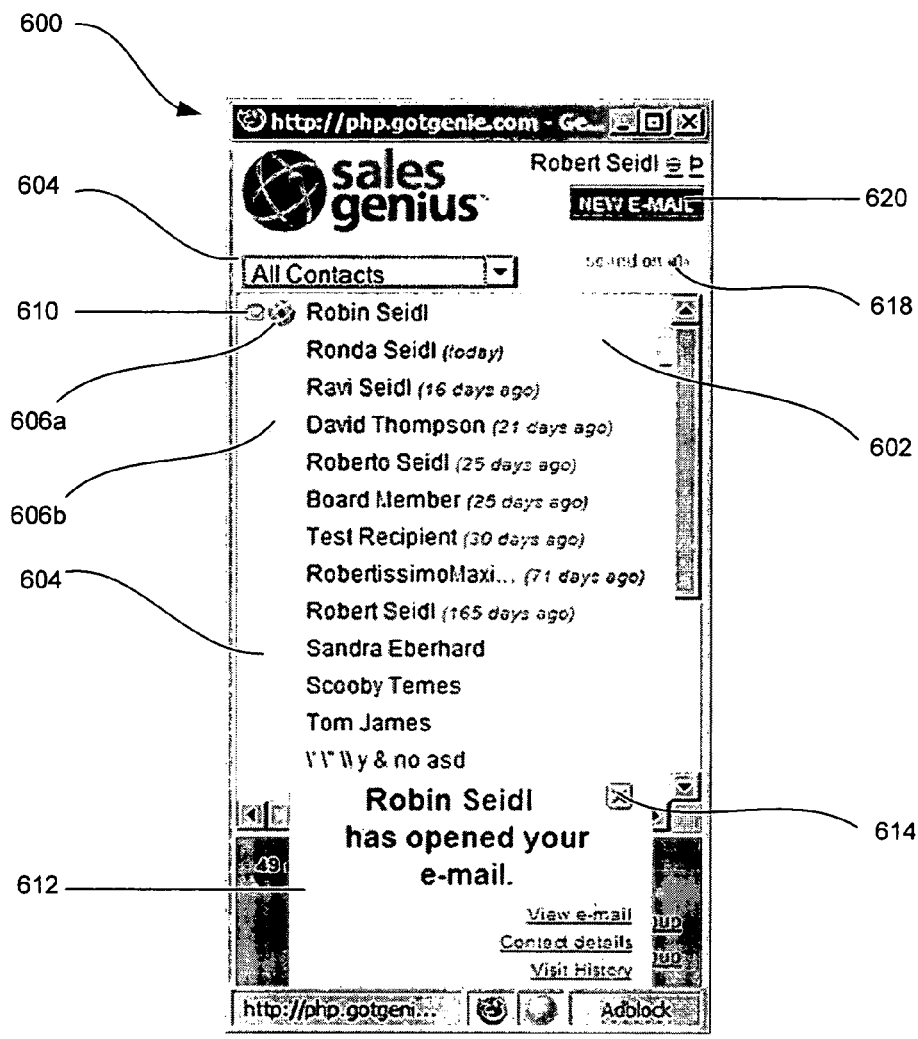
FIGS. 6A-6C illustrate embodiments of a client graphical user interface.
Figure 6B:
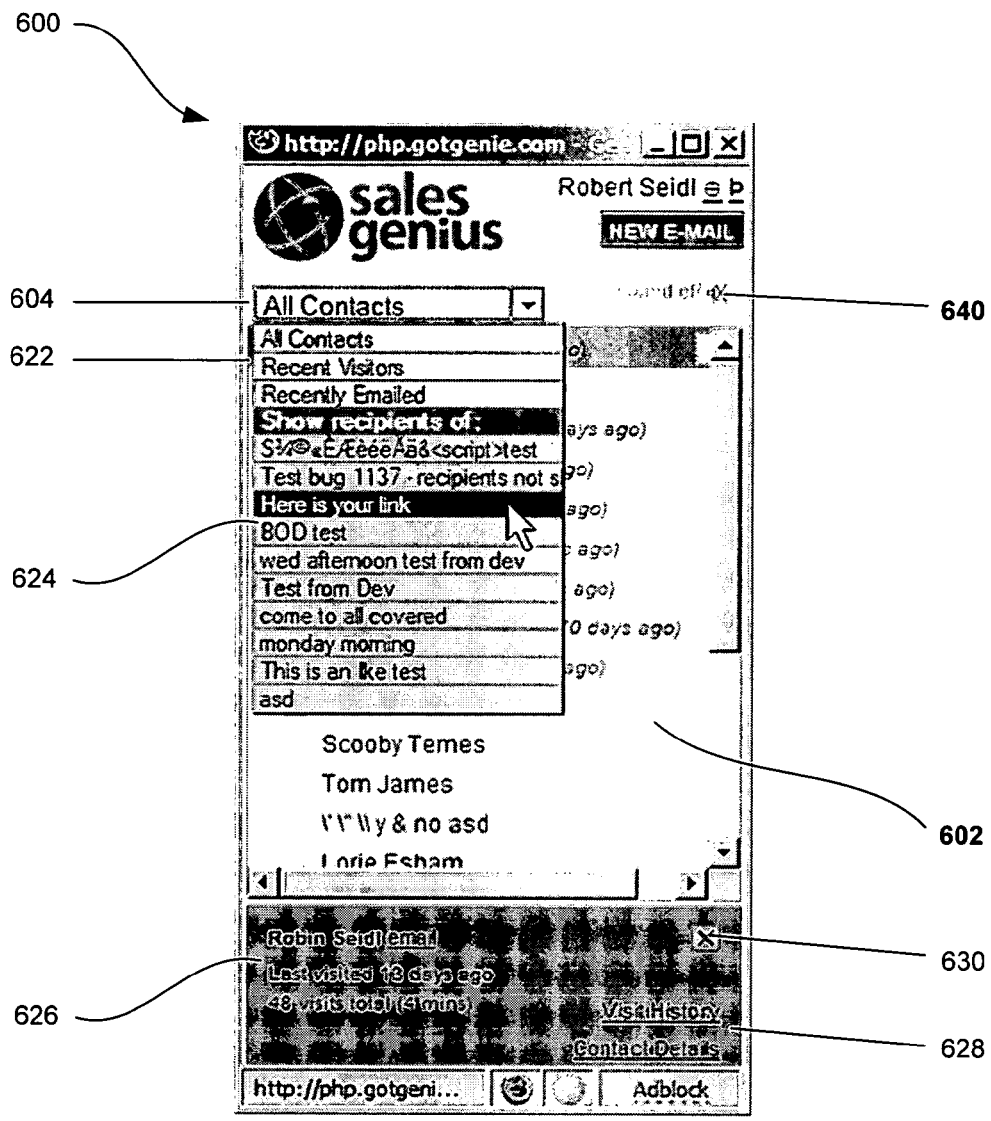
Figure 6C:
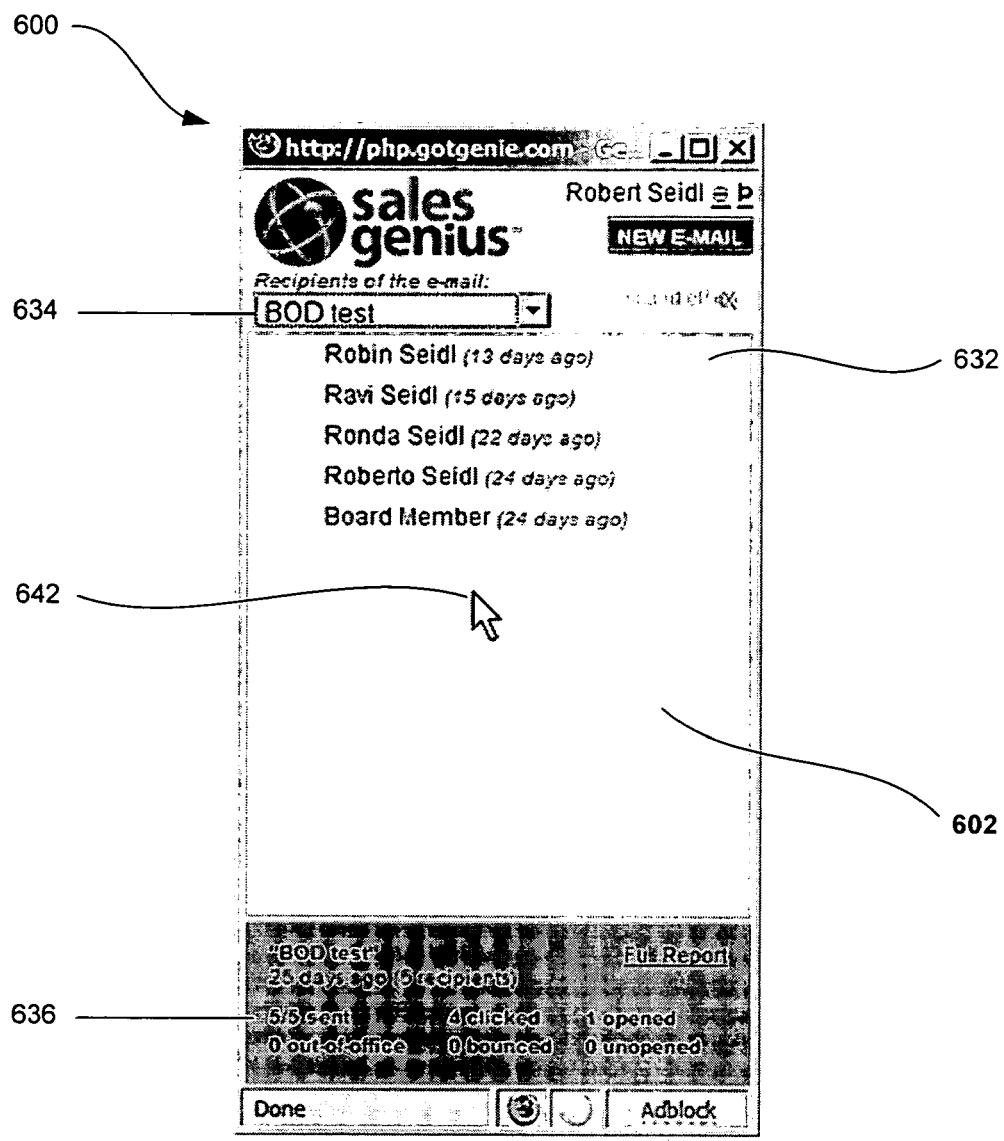

One embodiment of a client graphical user interface (client "GUI") 600 for viewing, automatically receiving, and manipulating clickflow data from the realtime database architecture is illustrated in FIGS. 6A-6C. In one embodiment the GUI is generated by software and/or hardware running on a client.

In one embodiment, the client GUI resembles an instant messenger (IM) user interface. The IM form of the client GUI 600 allows the client GUI to be displayed on a display device without filling a significant portion of the available display. Furthermore, the compact nature of an IM GUI provides for a portable display GUI that may conveniently be used on, for example, cellular telephones, PDAs, palmtop computers, etc.

The client GUI includes a drop-down menu 604 from which menu items, such as "All Contacts" can be selected. The contact data associated with a user of the client GUI may be stored in the an open client cache database, databases 106-110, or any other database. The GUI includes a window 602 for displaying the relevant data associated with the selected menu item. For example, when the "All Contacts" menu item is selected, a list of names, icons, and/or status updates corresponding to each contact 606a is displayed in the window 602.

In response to receiving a notification, as discussed above, a visual indicator of the notification, such as icon 610, window 612, and/or the changed appearance of an icon 606a verses 606b, may be displayed on the client GUI. Therefore, when, for example, Robin Seidl has opened an email that includes tracking information, client servers detect an update in tracking data relevant to the client GUI. In one embodiment, in order to determine that an email has been opened, an HTML image tag which requests a small dummy image from tracking server(s) is included in the HTML bodytext of the sent email. The request for the small dummy image is in the form of a modified URL, which encodes the customer, visitor, activity, as well as other data relevant to the email. In one embodiment, the HTML image tag might resemble:

<IMG SRC=http://www.salesgenius.rsvp1.com/W8e283223d WIDTH="1" HEIGHT="1">

When the email is opened, the email client utilized to read the email will request that image. As a result, a tracking server will resolve the modified URL, which goes to a script and/or web page that registers the email open event including all its customer/visitor/activity/relevant data in the database. In one embodiment, a similar mechanism is employed which is visible to the recipient of an email. The visibility allows for recipients to opt-out (or opt back into) receiving emails which include modified links.

This relevant data, which may indicate web presence 606a, or that an email has been opened 612 and 610, is then automatically pushed to the client GUI. Responsive to receiving the pushed update, the client GUI 600 displays the updated information along with audio and/or visual indicators for the notification.

Furthermore, the client GUI may indicate which contacts, from among all contacts, are currently being tracked verses those not being tracked. In one embodiment, client GUI indicates the online status with one visual icon 606a, indicating a contact is online, which differs from another visual icon 606b, indicating a contact is off line. The GUI 600 may also include audio features when updating data within the GUI or when receiving a notification.

In one embodiment, the updated data and notifications are automatically pushed to the GUI using industry standard protocols, such as HTTP, or data transfer protocols.

In one embodiment, client GUI 600 includes the option to limit how notifications are indicated. A region of the GUI, which when selected may turn "sound on" 618 for notifications, updates, etc. or upon selection may turn "sound off" 640 of FIG. 6B. Other mechanisms or logic for adjusting the visual and/or audio indicators of notifications and updates will be apparent to those skilled in the art.

In one embodiment, notifications may be programmatically set within the GUI, as discussed above. Therefore, notifications received and displayed by client GUI 600 may be based upon a predetermined likelihood of sale, a type of lead, a type of source, length of visit on a page, etc. Any form of notification relevant to a marketing professional may be received by client GUI 600. Furthermore, as discussed above, these notifications are received in pseudo realtime, so that a user of the client GUI 600 may stay abreast of the most current clickflow/marketing information available.

FIG. 6B illustrates additional features and provides more detail for client GUI 600. Upon receiving a selection from, for example a mouse cursor 642, drop-down menu drops down to reveal display options for data to be displayed in window 602 or 626. In one embodiment, the drop-down menu includes categories of data display, such as "All Contacts," "Recent Visitors," "Recently Emailed," or specific data to be displayed, such as showing recipients of a specific email "BOD Test."

In one embodiment, GUI 600 includes a region 626 that displays information for an individual being tracked, such as Robin Seidl, or selected recipients of a specific email "BOD Test" 636. Furthermore, when the regions 626 and 636 are displaying information pertaining to a data object, the information may include links which, when selected, cause the client GUI 600 to display additional information, such as "Visit History," "Contact Details," "Full Report," etc.

Figure 8A:
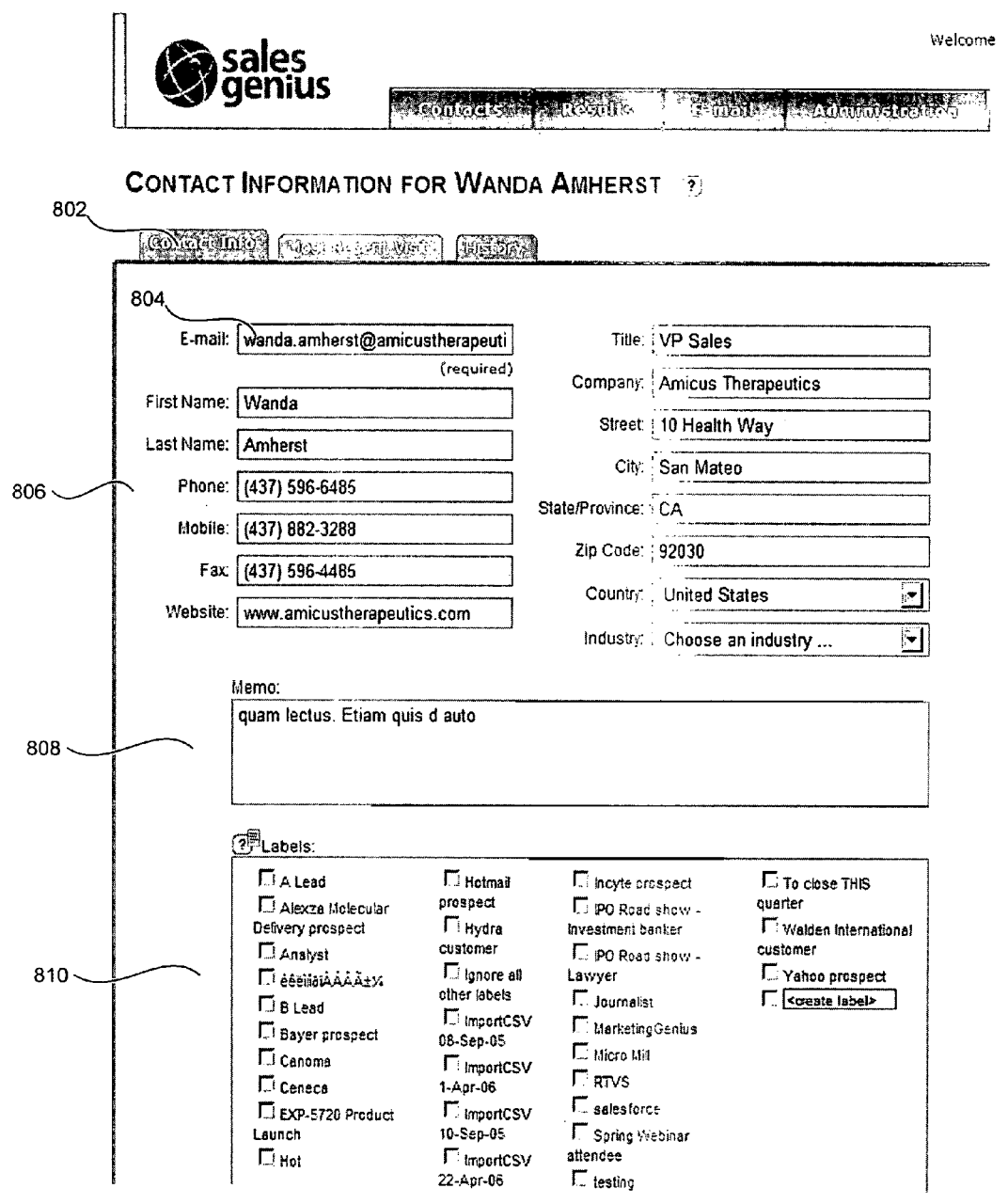
Figure 8B:
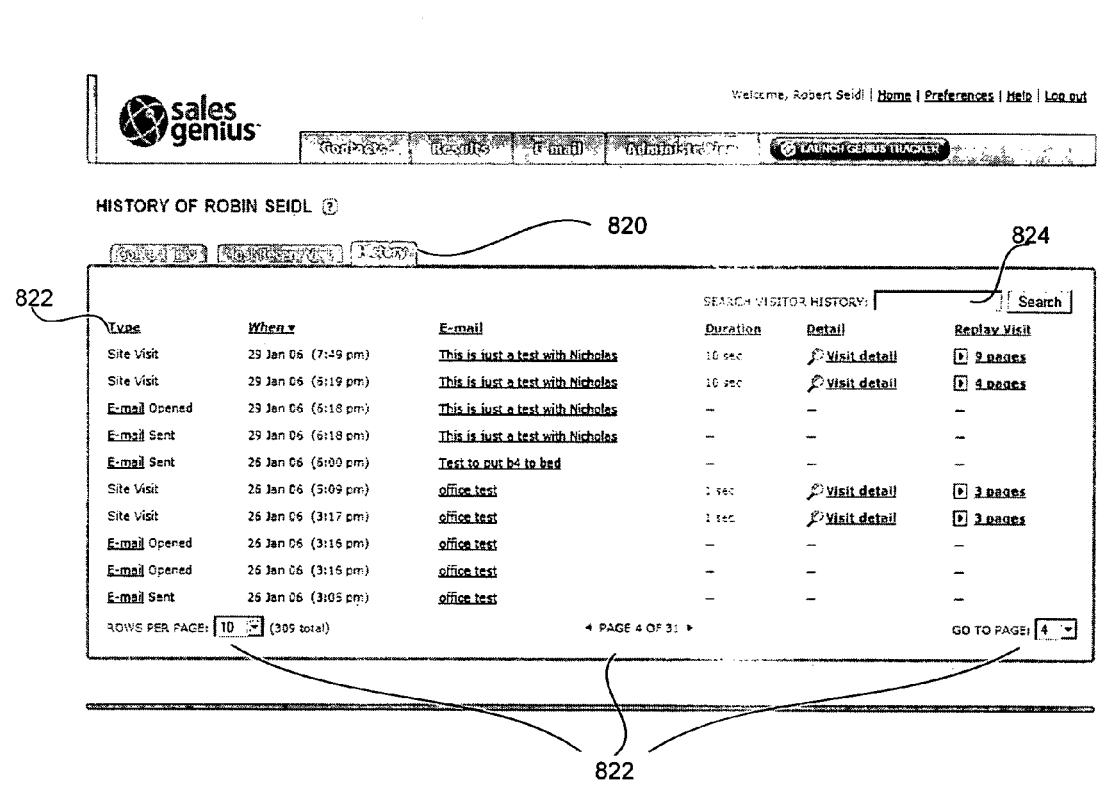
Figure 8C:
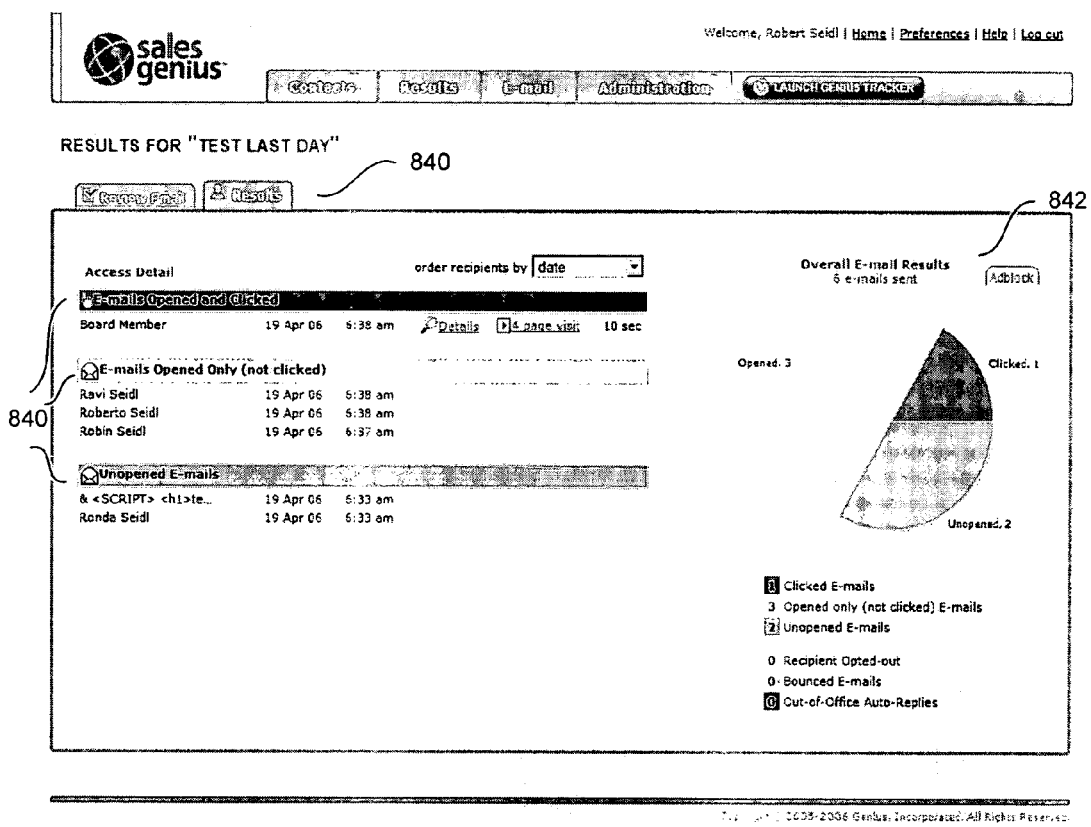

FIGS. 8A-8C illustrate detailed views of data displayable by a client GUI in response to a user selection. In one embodiment, "Contact Details" when selected will cause the client GUI to display various pieces of data 806-810 associated with a user-defined contact 804. Because contact details are specific to a particular person, group, entity, etc., details are only displayed after a contact e-mail address is received. The GUI of FIG. 8A requests contact details for the specified e-mail address from one or more of databases 106-110 and 122. Contact details may also be stored locally on a computer system utilized to display the GUI of FIG. 8A. In one embodiment, various contact details 806, such as first name, last name, phone number, title, zip code, etc. are available for storing information associated with a contact. Furthermore, in one embodiment, a personalized memo 808 may be received by GUI 802, which further specifies contact details for the specific contact 804. Labels 810, such as "A Lead," "Hot," "Journalist," etc., are also displayed within GUI 8A so that GUI 8A may also receive a user-selectable labels to be associated with a contact. However, GUI 8A need not be restricted to predefined labels, as labels may also be created by a user of GUI 8A. Therefore, a comprehensive set of details corresponding to a specific contact 804 may be presented by GUI 8A. Contact data is further updated in databases 106-110 and 122, by the GUI upon the GUI receiving new contact e-mail addresses, deletion of contacts, modification of existing contacts, etc. One skilled in the art will recognize the various details that may be included as contact information.

In one embodiment, realtime database architecture may update contact details and clickflow relevant data associated with a contact, as discussed in greater detail above.

In one embodiment, when "Visit History" selection is received by a GUI, such as GUIs 6A-6C, the selection will cause a client GUI 600 to display various clickflow tracking history details 820. In one embodiment, history details include, for example, type of activities with a history, when the activity occurred, an e-mail address for a contact that triggered an activity, the duration of the activity stored in history, details, a replay feature which replays the activity (e.g., replays a user traversing and interacting with a web site), etc. In one embodiment, the history details are stored in one or all of databases 106-110 and 122, as clickflow tracking data is captures by rewriter server(s) 120. Furthermore, as updated and relevant data is stored in databases, the realtime database architecture updates the history details, as discussed in greater detail above. In one embodiment, History information 822 displayed by GUI 8B includes user-selectable preferences 826 for displaying history information, such as rows displayed per page, icons or graphics which receive user selection of pages to scroll between, user-selectable page to display, etc. Additionally, in one embodiment, GUI 8B may receive a user entered search request entered in a data entry field 824 of the GUI illustrated in FIG. 8B. Thus, History details may be displayed based upon user-defined searches, by user-selectable references, etc. Further, upon the GUI receiving user selection of a link within the history window, GUI will request data associated with the link from databases 106-110 and 122.

In one embodiment, when selection of "Full Report," is received by a GUI, such as client GUI 600, the GUI requests detailed information from databases 106-110 and 122 associated with the request. For example, databases may contain data for an email advertisement campaign entitled "Test Last Day." Results information, is requested from databases 106-110 and 122 by the GUI illustrated in FIG. 8C, upon receiving a request for clickflow data associated with the campaign. The results are then displayed by the GUI once received. In one embodiment, results are displayed statistically 842. In one embodiment, results are displayed according to categories, such as "E-Mails Opened and Clicked," "E-Mails that have Only Been Opened," "Unopened Emails," etc. 844. In one embodiment, as updated data becomes available in the realtime database architecture, data is automatically pushed to the GUI so that he GUI can display updated Results data in real time.

One skilled in the art will recognize that there are virtually endless types of information that can be displayed by a GUI, such as client GUI 600 as databases 106-110 record and supply various forms of clickflow relevant data through server(s) 124.

Returning to FIG. 6, because comprehensive clickflow data is stored in databases 106-110 and open client cache DB 122, client GUI 600 may include buttons or icons 632 which, when selected, cause the GUI to replay a tracked traversal of a web page. As discussed above, one element of the tracked clickflow data is the sequence of web pages traversed by a tracked individual. For example, in response to icon 632 being selected, client GUI 600 requests from a database, such as client cache database, clickflow log db, etc. the sequence of web pages traversed by Robin Seidl. This data is returned to GUI 600 so that the GUI 600 may itself replay the traversal or cause another application, such as a standard web browser to replay the traversal. The traversal may be a displayed by or through GUI 600 as a movie, as a tabbed document, a graph showing visited web pages, a graph showing thumbnail nodes and the path a user took as numbered edges of the nodes, etc.

When the client GUI 600 has received a notification 612, the notification may include an icon or region 614 which, when selected, close the notification and remove it from the current client GUI 600. In one embodiment, the notification 612 may also include links 616, which when selected, would cause the client GUI to display information associated with the selected link. For example, upon selection of view email, client GUI may display the e-mail which was opened by Robin Seidl within the GUI, or be configured to launch an e-mail client program to display the email.

In one embodiment, a user may position a mouse pointer (not shown) or other cursor device to make selections, the selections received by the client GUI 600. In another embodiment, a user may perform keystrokes on a keyboard to make selections, the keyboard selections also received by the client GUI 600.

As discussed above, client server(s) 124 automatically push updates to relevant data items currently being displayed by client GUI 600. Therefore, client server(s) 124 obtain information from client GUI 600 pertaining to the GUI's currently open display windows. As an example, when client GUI 600 is currently displaying email recipients of the email "BOD Test" in windows 602 and summary data related to "BOD Test" in window 636, client servers will use the data items currently displayed in windows 636 and 602 to compute a Δdata. Therefore, client server(s) need not use resources to update data which is not relevant to the current data being displayed by client GUI 600.

In one embodiment, client GUI 600 may be resized according to the directions of a user, or minimized by a user so that the client GUI 600 stays online, even though a user is not currently viewing the GUI. In another embodiment, the GUI may be sensitive to the display device currently being used to display the client GUI 600, so that the GUI automatically configures itself to an appropriate size and dimension.

Figure 7A:
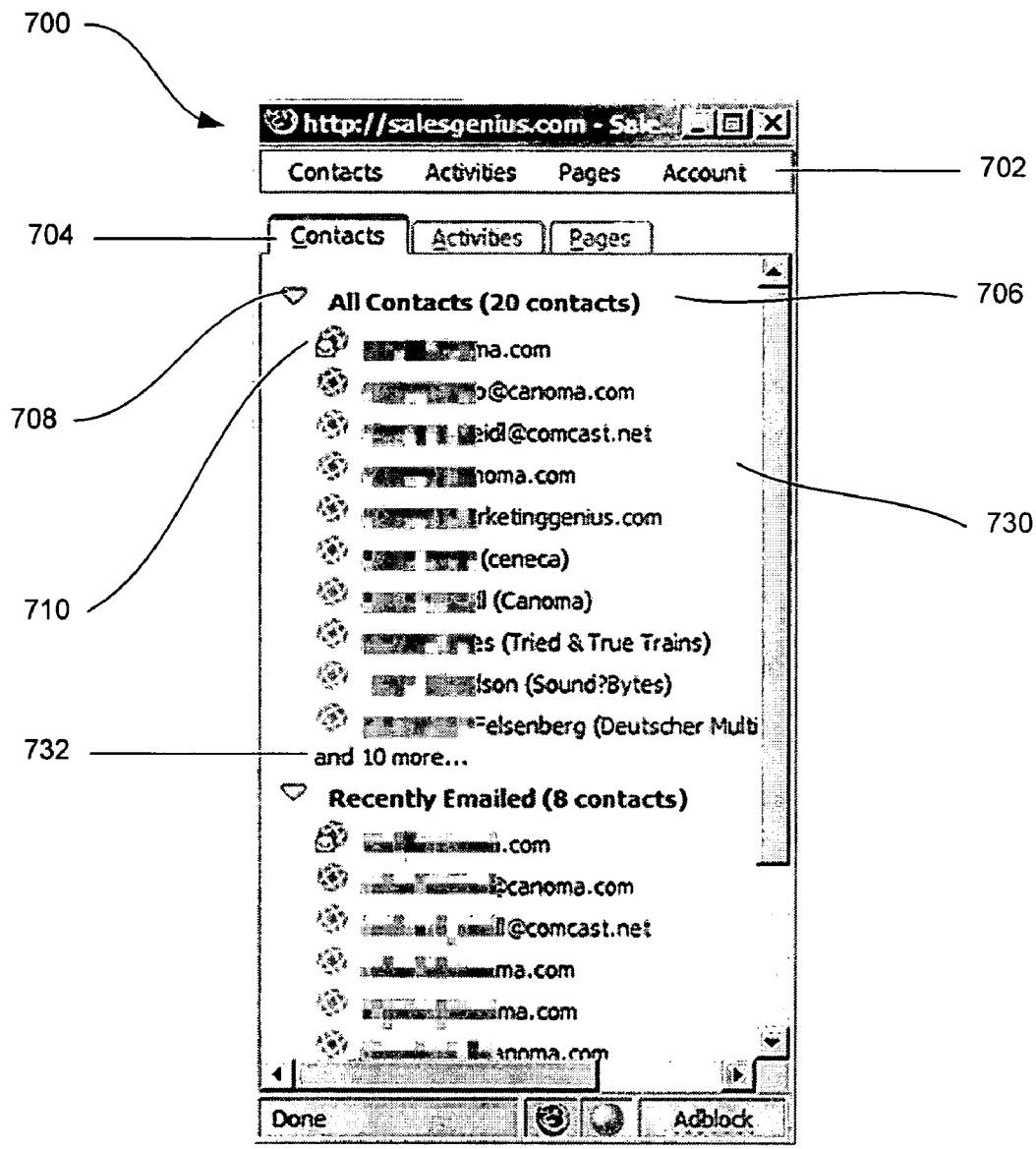
FIGS. 7A-7B illustrate embodiments of a client graphical user interface.
Figure 7B:
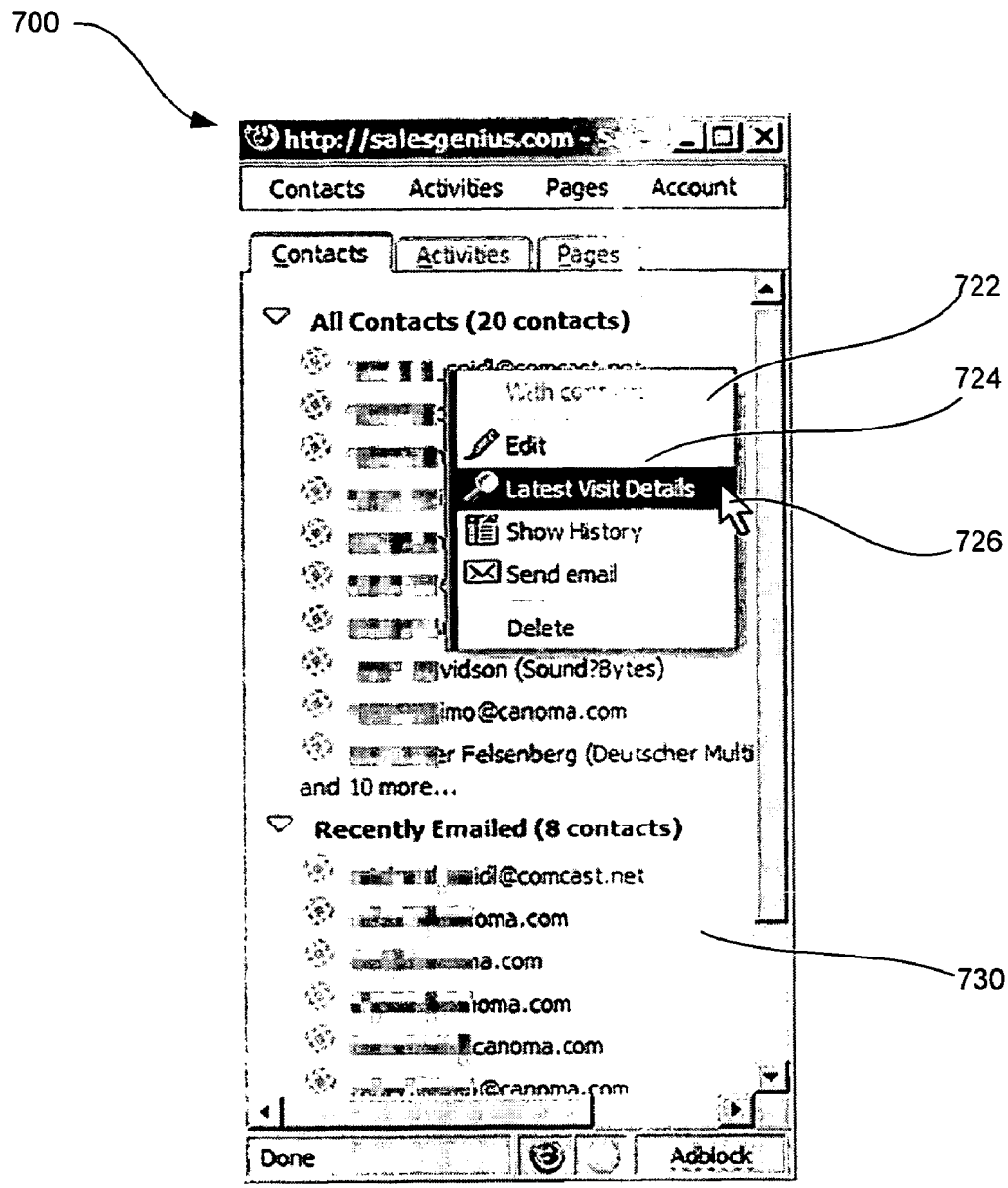

Another embodiment of a client GUI 700 is illustrated in FIGS. 7A and 7B. Client GUI 700 may include a menu region 702, tab region 704, and a window region 730. In one embodiment, menu region 702 includes menus, which when selected by a mouse cursor or other selection method, drop down menu items associated with a selected menu item for displaying various menu items. For example, in response to receiving a selection of "Activities," client GUI 700 causes the Activities menu to drop down and display the menu items associated with the Activities Menu.

In one embodiment, tab region 704 contains user selectable tabs. The tab regions include various tabs, such as "Contacts," "Activities," and "Pages," where selection causes information corresponding to the selected tab to be displayed in window 730. The currently selected tab may indicate, or be used by, client server(s) 124 to determine what data is relevant and in need of automatic updates. Included in the display of the selected tab in window 730, are categories of data items. The categories may include "All Contacts," "Recently Emailed," "Current Activities," "Specific Activities," "Pages Being Tracked," etc. In one embodiment, the categories correspond to complex database queries. The complex database queries are system and/or customer defined programmatic conditions which are utilized by the realtime database architecture to supply the GUI with results based on user-defined database queries. For programmatic conditions, a list of subitems are included in the display. In one embodiment, for a contacts condition (e.g., the contacts for a specific user), the subitems may include any or all of members associated and/or maintained by the specific user. For activity programmatic conditions, various email, Google Advertisement Activities, etc. that match the programmatic conditions are supplied in the GUI. For page conditions, various pages requested by visitors have that match page conditions are supplied in the GUI. In one embodiment, when a group of contacts is associated with a condition has numerous members, GUI requests information corresponding to a smaller number of members of the group (e.g., for example, requesting the first 10 members of a group). If the GUI displays a smaller number of group members than all group members, an additional entry appears in the GUI which indicates more results are available (e.g., for example illustrated in FIG. 8B).

In one embodiment, each category of data item displayed under a selected tab in window 730 further includes an icon, button, or display region 708, that when selected may maximize or minimize the data items associated with the data category. The client GUI 700 may further limit the data items displayed under a data category with an indication 722 that more data items are available. Furthermore, each data item displayed within a category may include visual or audio indicators 710 as to current activities or updates which effect the data item. For example, when client GUI 700 is displaying "All Contacts," an icon representing an envelop may appear on or next to a data item. In the example, this may indicate that the contact has either opened, received, responded, or otherwise interacted with an email message. These indications may be received and displayed by the client GUI 700 as automatically updated data pushed by client server(s), or as realtime notifications, displayed within GUI 700.

In one embodiment, upon receiving an indication of selection by a mouse cursor 726, a window 722 is displayed by the client GUI 700. This window may include options relevant to operations that can be performed on the selected data item. For example, when a contact is selected from "All Contacts," options are displayed in window 722 which may include "Edit," "Latest Visit Detail," "Delete," etc. In one embodiment, operations can be applied to any type of object: contact, activity, page, contact groups, activity groups, page groups, etc. One skilled in the art will recognize the various options available for managing data items. In one embodiment, when "Latest Visit Detail" is selected, the selection causes the client GUI to display another window (not shown) within window 730 or exterior to client GUI 700 which contains clickflow data corresponding to the selected contact's latest visit details.

Figure 9:
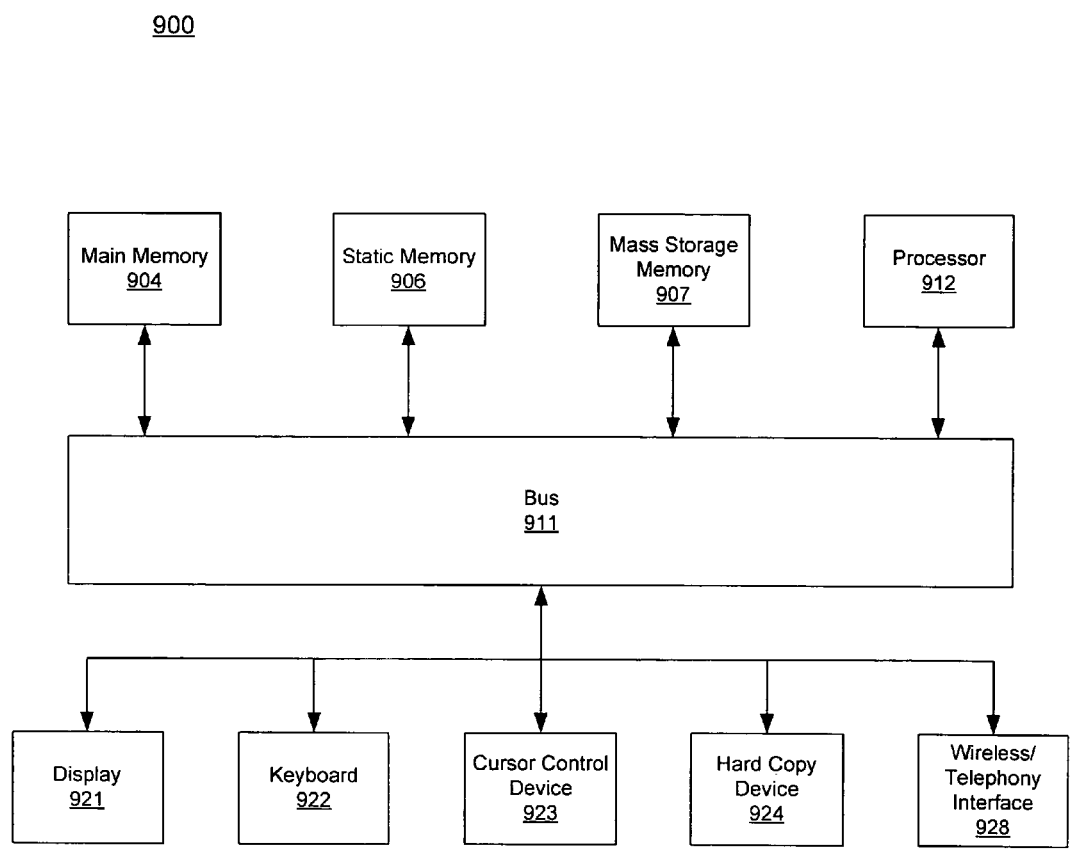
FIG. 9 is a block diagram of an exemplary computer system.

FIG. 9 is a block diagram of an exemplary computer system that may perform one or more of the operations described herein. Referring to FIG. 9, computer system 900 may comprise an exemplary client or server computer system. Computer system 900 comprises a communication mechanism or bus 911 for communicating information, and a processor 912 coupled with bus 911 for processing information. Processor 912 includes a microprocessor, but is not limited to a microprocessor, such as, for example, Pentium™, PowerPC™, Alpha™, etc.

System 900 further comprises a random access memory (RAM), or other dynamic storage device 904 (referred to as main memory) coupled to bus 911 for storing information and instructions to be executed by processor 912. Main memory 904 also may be used for storing temporary variables or other intermediate information during execution of instructions by processor 912.

Computer system 900 also comprises a read only memory (ROM) and/or other static storage device 906 coupled to bus 911 for storing static information and instructions for processor 912, and a data storage device 907, such as a magnetic disk or optical disk and its corresponding disk drive. Data storage device 907 is coupled to bus 911 for storing information and instructions.

Computer system 900 may further be coupled to a display device 921, such as a cathode ray tube (CRT) or liquid crystal display (LCD), coupled to bus 911 for displaying information to a computer user. An alphanumeric input device 922, including alphanumeric and other keys, may also be coupled to bus 911 for communicating information and command selections to processor 912. An additional user input device is cursor control 923, such as a mouse, trackball, trackpad, stylus, or cursor direction keys, coupled to bus 911 for communicating direction information and command selections to processor 912, and for controlling cursor movement on display 921.

Another device that may be coupled to bus 911 is hard copy device 924, which may be used for marking information on a medium such as paper, film, or similar types of media. Another device that may be coupled to bus 911 is a wired/wireless communication capability 925 to communication to a phone or handheld palm device.

Note that any or all of the components of system 900 and associated hardware may be used in the present invention. However, it can be appreciated that other configurations of the computer system may include some or all of the devices.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A computer-implemented method, comprising:
    determining, from among a plurality of data items displayable by a client to a first user, one or more relevant data items to be supplied to the client for display to the first user, the plurality of data items displayable by a client located in a first database that stores real-time tracking data corresponding to a tracked second user's interactions with a website, wherein the plurality of data items corresponding to the tracked user's interactions with the website comprise one or more of clickflow data, presence on a web page, presence on a web site, sequence of pages traversed, time on page, time on site, referrer, host internet protocol address, email received, email bounced, email read;
    automatically supplying the one or more relevant data items to the client for display to the first user;
    storing a copy of the supplied one or more relevant data items in a second database; in response to client requests, providing the one or more relevant data items to the client from the second database;
    determining a set of data items, corresponding to the tracked second user's interactions with the website, currently being displayed in a graphical user interface of the client;
    determining a current version of the data items that are currently displayed by the client by comparison of a version of each of the set of data items stored in the first database with each of the set of data items stored in the second database to determine which of the one or more items from the set and currently being displayed is different from the version stored in the first database and not current in the second database; and
    automatically supplying one or more current data items from the first database in response to the comparing, corresponding to the one or more items currently being displayed which are not current, to the client to be displayed by the client user interface.

2. The computer-implemented method of claim 1, wherein the client has a user interface.

3. The computer-implemented method of claim 2, wherein the determining further comprises:
    determining when the client is on-line.

4. The computer-implemented method of claim 2, wherein automatically supplying further comprises:
    pushing the one or more relevant data items to the client.

5. The computer-implemented method of claim 4, wherein the data is pushed to the client over Hyper Text Transfer Protocol port 80.

6. The computer-implemented method of claim 1, further comprising:
    replacing data items, stored in the second database, with the one or more current data items supplied from the first database, the second database updated to contain current versions of data items currently being displayed by the graphical user interface of the client.

7. The computer-implemented method of claim 1, wherein the one or more current data items are supplied in pseudo realtime.

8. The computer-implemented method of claim 1, wherein the data items displayable to the client are data items selected from one of contact information data, page information data, or activities information data.

9. The computer-implemented method of claim 1, further comprising:
    automatically supplying the plurality of data items displayable by a client when the client is first opened; and
    storing a copy of the plurality of data items displayable by the client in the second database.

10. A computer-readable storage medium that provides instructions, which when executed by a machine, causes the machine to perform the operations comprising:
    determining, from among a plurality of data items displayable by a client to a first user, one or more relevant data items to be supplied to the client for display to the first user, the plurality of data items displayable by a client located in a first database that stores real-time tracking data corresponding to a tracked second user's interactions with a website, wherein the plurality of data items corresponding to the tracked user's interactions with the website comprise one or more of clickflow data, presence on a web page, presence on a web site, sequence of pages traversed, time on page, time on site, referrer, host internet protocol address, email received, email bounced, email read;

automatically supplying the one or more relevant data items to the client for display to the first user;

storing a copy of the supplied one or more relevant data items in a second database; in response to client requests, providing the one or more relevant data items to the client from the second database;

determining a set of data items corresponding to the tracked second user's interactions with the website currently being displayed in a graphical user interface of the client;

determining a current version of the data items that are currently displayed by the client by comparison of a version of each of the set of data items stored in the first database with each of the set of data items stored in the second database to determine which of the one or more items from the set and currently being displayed is different from the version stored in the first database and not current in the second database; and automatically supplying one or more current data items from the first database in response to the comparing, corresponding to the one or more items currently being displayed which are not current, to the client to be displayed by the client user interface.

11. The computer-readable storage medium of claim 10, wherein the client has a user interface.

12. The computer-readable storage medium of claim 11, wherein the determining further comprises:
determining when the client is on-line.

13. The computer-readable storage medium of claim 11, wherein automatically supplying further comprises:
pushing the one or more relevant data items to the client.

14. The computer-readable storage medium of claim 13, wherein the data is pushed to the client over Hyper Text Transfer Protocol port 80.

15. The computer-readable storage medium of claim 10, further comprising:
replacing data items, stored in the second database, with the one or more current data items.

16. The computer-readable storage medium of claim 15, wherein the one or more current data items are supplied in pseudo realtime.

17. The computer-readable storage medium of claim 10, wherein the data items displayable to the client are data items selected from one of contact information data, page information data, or activities information data.

18. The computer-readable storage medium of claim 10, further comprising:
automatically supplying the plurality of data items displayable by a client when the client is first opened; and
storing a copy of the plurality of data items displayable by the client in the second database.

19. A system, comprising:
a memory to store a second database; and
a server coupled with the memory, wherein a processor of the server to:
determine, from among a plurality of data items displayable by a client to a first user, one or more relevant data items to be supplied to the client for display to the first user, the plurality of data items displayable by a client located in a first database corresponding to a tracked second user's interactions with a website, wherein the plurality of data items corresponding to the tracked user's interactions with the website comprise one or more of clickflow data, presence on a web page, presence on a web site, sequence of pages traversed, time on page, time on site, referrer, host internet protocol address, email received, email bounced, email read;
automatically supply the one or more relevant data items to the client for display to the first user; and
store a copy of the supplied one or more relevant data items in the second database; in response to client requests, provide the one or more relevant data items to the client from the second database;
determine a set of data items corresponding to the tracked second user's interactions with the website currently being displayed in a graphical user interface of the client; determining a current version of the data items that are currently displayed by the client by comparison of a version of each of the set of data items stored in the first database with each of the set of data items stored in the second database to determine which of the one or more items from the set and currently being displayed is different from the version stored in the first database and not current in the second database; and
automatically supply one or more current data items from the first database in response to the comparison, corresponding to the one or more items currently being displayed which are not current, to the client to be displayed by the client user interface.

20. The system of claim 19, wherein the client has a user interface.

21. The system of claim 20, wherein the server to determine further comprises:
the server to: determine when the server is on-line.

22. The system of claim 20, wherein the server to automatically supply comprises:
the server to: push the one or more relevant data items to the client.

23. The system of claim 22, wherein the data is pushed to the client over Hyper Text Transfer Protocol port 80.

24. The system of claim 19, further comprising:
the server to:
replace data items, stored in the second database, with the one or more current data items.

25. The system of claim 19, wherein the one or more current data items are supplied in pseudo realtime.

26. The system of claim 19, wherein the data items displayable to the client are data items selected from one of contact information data, page information data, or activities information data.

27. The system of claim 19, further comprising:
the server to:
automatically supply the plurality of data items displayable by a client when the client is first opened; and
store a copy of the plurality of data items displayable by the client in the second database.

* * * * *